June 1, 1954

J. M. TYLER 2,679,837

HOT FUEL PRIMING SYSTEM

Filed May 26, 1952

INVENTOR
JOHN M. TYLER

BY Charles A. Warren

ATTORNEY

Patented June 1, 1954

2,679,837

UNITED STATES PATENT OFFICE 2,679,837

HOT FUEL PRIMING SYSTEM

John M. Tyler, South Coventry, Conn., assignor to United Aircraft Corporation, East Hartford, Conn., a corporation of Delaware Application May 26, 1952, Serial No. 290,101

19 Claims. (Cl. 123—180)

This invention relates to engine starting and particularly to a system for supplying heated fuel to the engine during the starting operation.

One feature of the invention is a priming system so arranged that the engine starter is energized when the fuel is heated to the selected temperature such that the priming and starting operation is automatic. Another feature is the control of the fuel flow so that no priming fuel is admitted to the engine until the starter is in operation.

Under certain conditions the power supply available will not carry the entire load of the heater and starter at one time. One feature of the invention is the operation of the fuel heater and starter in sequence, so arranged that while the starter is operating the fuel heater will not be energized, thereby avoiding a heavy overload where the capacity of the power supply is limited.

One feature of the invention is an arrangement for varying the temperature to which the priming fuel is heated as a function of the ambient temperature so that the lower the ambient temperature the higher the temperature of the fuel.

Other objects and advantages will be apparent from the specification and claims, and from the accompanying drawings which illustrate an embodiment of the invention.

Figure 1:
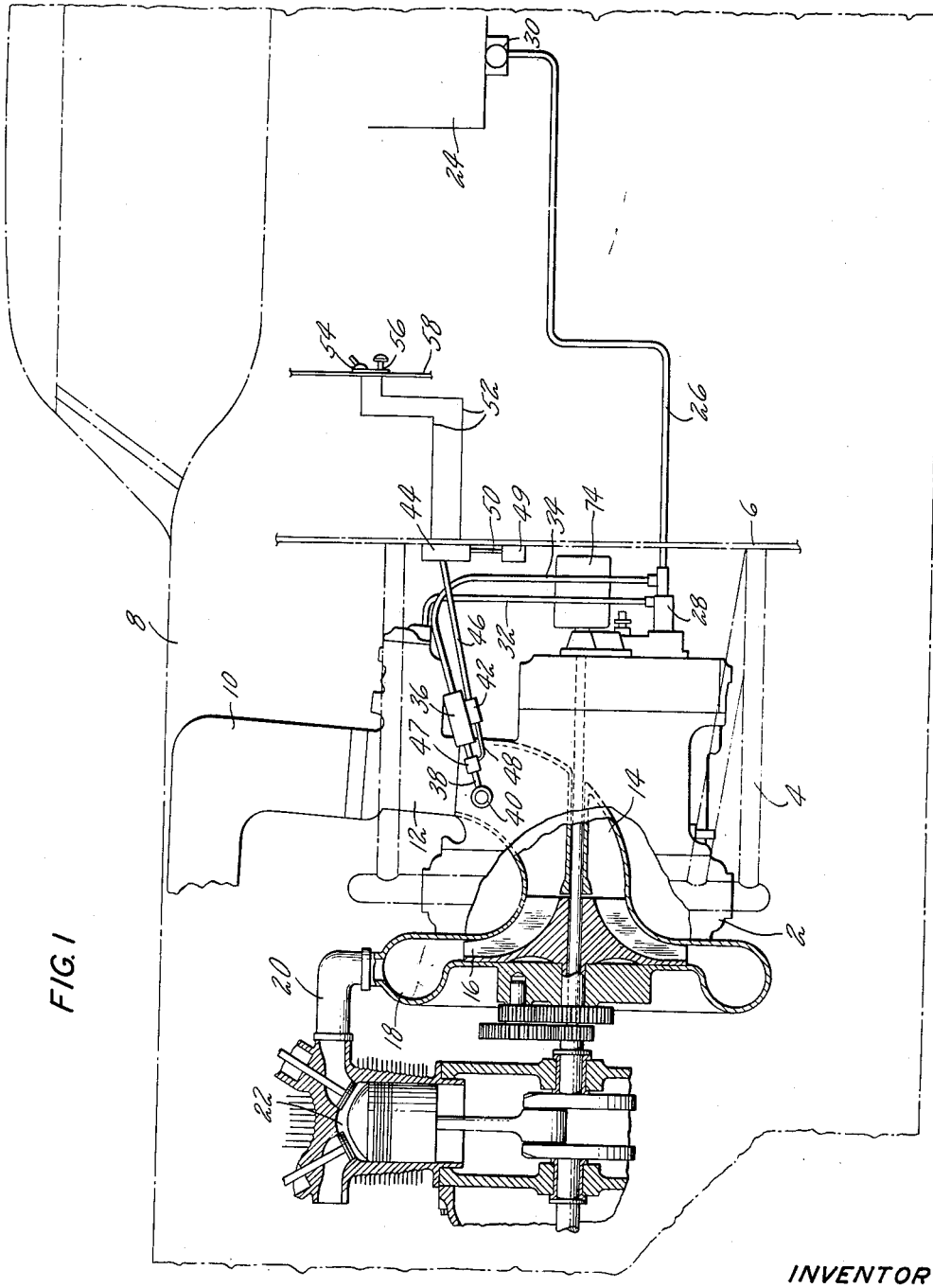
Fig. 1 is a diagrammatic view of the heated fuel priming system as applied to an engine in an aircraft.

With reference first to Fig. 1, the device is shown as attached to an engine 2 supported by an engine mounting system 4 in an airplane 8. The engine has an induction system including an air inlet duct 10 communicating with a carburetor 12. From the carburetor 12 the air passes through a duct 14 to the supercharger 16 which discharges into the intake manifold 18. The latter is connected by pipes 20 to the individual engine cylinders 22.

Fuel for the engine is supplied from a tank 24 through a conduit 26 to the engine driven fuel pump 28. A boost pump 30, not engine driven, may be used at the tank to provide the required fuel pressure at the engine. From the engine driven pump 28 fuel is directed through a pipe 32 to the carburetor 12 for normal engine operation. Fuel is also admitted from the duct 26 through a pipe 34 to a priming fuel heater 36 and thence through a pipe 38 to the priming nozzle 40. This latter is located in a position to direct fuel into the induction system upstream of the supercharger 16.

The purpose of the priming system is to admit heated fuel to the induction system for the purpose of starting the engine under extremely cold conditions. The priming system includes, in addition to the heater 36, a thermostatic control 42 having an electrical connection with a control relay box 44 by means of the cable 46, and a priming fuel solenoid valve 47 having an electrical connection 48, Fig. 1, with the thermostatic control 42. The conventional starter solenoid switch 49 is electrically connected to the control relays in the box 44 by a cable 50 and the control relays are connected by cables 52 to a primer switch 54 and a starter switch 56 both of which are located on the instrument panel 58. It will be understood that the primer switch 54, the starter switch 56 and the starter solenoid switch 49 are already in existence in the airplane for use in the conventional priming system.

Figure 2:
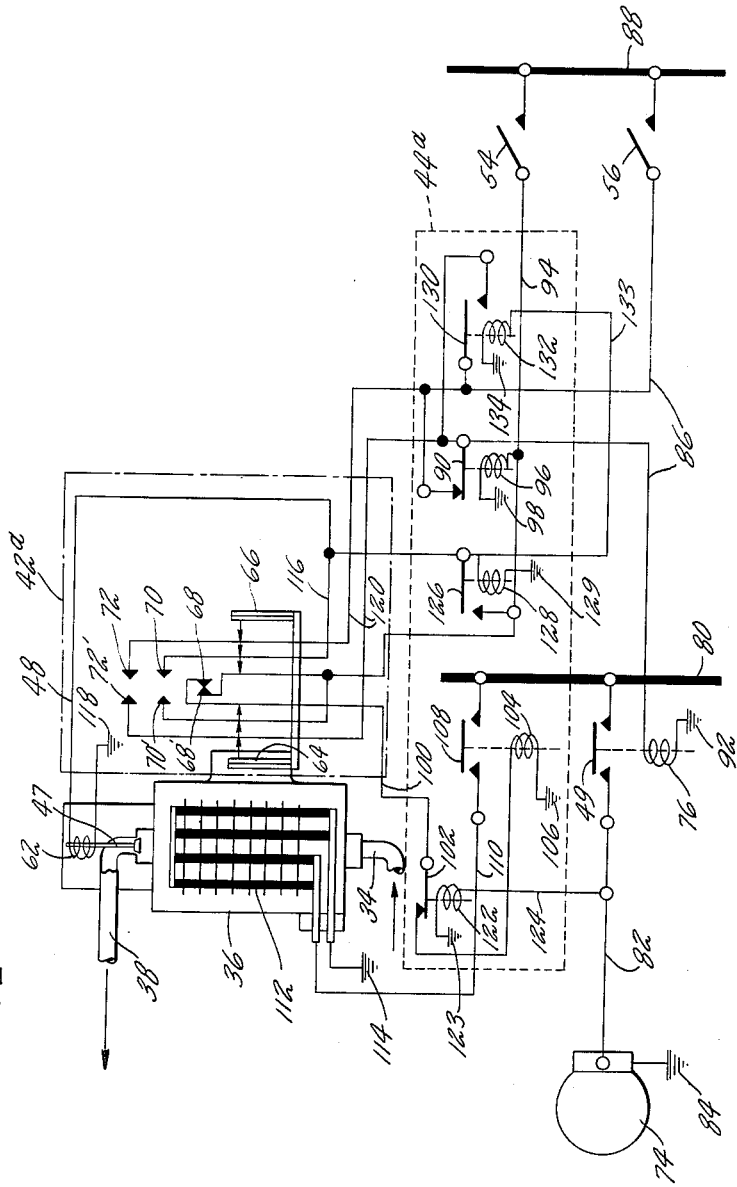
Fig. 2 is a circuit diagram of the system.

The diagram of Fig. 2 shows the elements above described in diagrammatic relation in which the dot-dash line 42a represents the thermostatic control box 42, and the dash line 44a represents the control relay box 44. The priming fuel heater 36 has the inlet pipe 34 and the outlet pipe 38 as above described in connection with Fig. 1. The normally closed priming fuel solenoid valve 47 is mounted at the outlet of the priming fuel heater 36. This valve 47 is opened by a solenoid 62 as will be later described.

Associated with the fuel heater is a bimetal thermal strip 64 preferably enclosed within the heater and subject to the temperature of the fuel within the heater. Another bimetal strip 66 senses the ambient temperature and functions to position the three contacts 68, 70 and 72 of a thermostatic gang switch as a function of ambient temperature. The bimetal strip 64 positions the cooperating contacts 68', 70' and 72' of the gang switch as a function of priming fuel temperature. The bimetal strips and the gang switch form the thermostatic control enclosed within the box 42.

The engine has a starter 74 which is normally controlled by the starter switch 56, the function of which is to energize the starter from a starting solenoid 76 acting on a solenoid switch 49. When the switch 49 is closed, the starting motor is powered from a power line 80 through a lead 82 to the starter and thence to a ground connection 84.

The hot fuel priming system is so arranged that the starter switch may be utilized to turn the engine over before energizing the priming system to make sure there is no hydraulic lock in the engine. To effect this, the starter switch 56 is located in a circuit 86 from a power lead 88 through a solenoid actuated switch 90 and thence through the solenoid 76 to a ground connection 92. The switch 90 is normally closed so that when the starter switch 56 is closed the circuit 86 is complete and the solenoid actuated switch 49 will be closed to operate the starter.

After the engine has been turned over as above outlined, the hot fuel priming system is then energized for a "cold" start by first closing the primer switch 54 and subsequently the starter switch 56. When the primer switch 54 is closed, it completes a circuit from the power line 88 through a circuit 94 to a solenoid 96 for switch 90 and thence to a ground 98. When the solenoid 96 is energized, the switch 90 is opened so that subsequent manual closing of the starter switch will not have any immediate effect upon the engine starter. The circuit 94 which is controlled by the primer switch 54 extends not only to the solenoid 96 but also to the contacts 68' and 70' of the gang switch.

Under cold starting conditions the several contacts of the gang switch are in the position shown in which the contacts 68 and 68' are in engagement. The circuit 94 to the contact 68' is extended, when contacts 68 and 68' are in engagement, by a lead 100 from contact 68 through a normally closed switch 102 to a solenoid 104 and thence to a ground 106. The solenoid 104 controls a normally open switch 108 in a circuit 110 from the power supply line 80 through heater elements 112 in the heater and thence to a ground 114. The closing of the switch 54 therefore initiates heating of the fuel within the heater.

The circuit through the heater elements remains closed until the fuel is heated to the selected temperature for the operation of the bimetal strip 64. At this temperature the movement of the strip operates to break the connection between the contacts 68 and 68' and simultaneously to establish a connection between the contacts 70 and 70' and also between contacts 72 and 72'. It will be apparent that the temperature at which gang switch is actuated is the temperature to which it has been found that the fuel should be heated for the purpose of effectively starting the engine under cold conditions. Opening of contacts 68 and 68' will break the circuit through solenoid 104 and thus open switch 108 for the heater elements.

When the contacts 70 and 70' are brought into engagement, electrical connection from the circuit 94 is extended through leads 116 and 48 from the contact 70 through the solenoid 62 for valve 47 and thence to a ground 118, thereby opening the outlet pipe 38 for admission of the hot fuel to the engine. At the same time the contacts 72 and 72' engage and complete a circuit through leads 120 which form a by-pass around the now open switch 90 so that the engine starter is energized.

While the engine starter is in operation a solenoid 122 for the switch 102 in the heater control circuit is energized from the lead 82 through a lead 124, and thence through solenoid 122 to a ground 123 thereby holding open the switch 102 while the starter is operating.

As soon as the flow of fuel through the heater begins, during the cranking of the engine, the cold fuel entering the heater will cause the bimetal strip 64 to move to a position to close contacts 68 and 68' thereby calling for the addition of more heat. The function of the solenoid 122 is to prevent energizing of solenoid 104 and thus closing of the heater switch 108 while the starter is operating, thereby to prevent overloading of the power source. If enough power is available, the solenoid 122 and the associated connections may be omitted.

When the contacts 70 and 70' are engaged, a holding circuit is completed through a switch 126 from the circuit 94 through the solenoid 62 so that the outlet valve 47 will be held open during the entire starting operation even though the contacts 70 and 70' are subsequently separated. The switch 126 is under the control of solenoid 128 which as will be apparent is energized when the contacts 70 and 72 are engaged but which stays energized from circuit 94 through the switch 126 and to a ground 129 after the switch 126 is closed.

In addition to the holding switch 126 for the priming fuel solenoid valve 47 there is also a holding switch 130 for the starter circuit. This switch 130 is arranged in parallel with the switch 90, thereby by-passing this switch. The switch 130 is closed by a solenoid 132 connected by a lead 133 to the switch 126 so that when this switch is closed solenoid 132 is energized. The solenoid 132 is also connected to a ground 134 so that this solenoid is energized by engagement between contacts 70 and 70'. Subsequent breaking of the connection between these contacts will not affect the solenoid because it continues to be energized through the switch 126.

After the engine has been started the starter switch 56 is opened. The primer switch 54 remains closed and priming continues and heating of the priming fuel continues whenever the contacts 68 and 68' are engaged. The starter may be re-engaged at any time during this operation by closing the starter switch 56. Priming will continue but the heater will be disengaged while the starter is engaged. Additional fuel through the normal channels may be supplied to the engine at any time during the starting cycle at the discretion of the pilot. When the engine has been warmed sufficiently and the cylinders are receiving enough fuel through the normal channels to continue running without prime the primer switch 54 is opened.

Since the bimetal strip 66 acts on the contacts 68, 70 and 72, it will be apparent that the temperature to which the fuel is heated is affected by the ambient temperature such that the lower the ambient temperature the higher the temperature of the priming fuel must be before the starter is energized. In this way as the starting conditions become more severe by reason of lower ambient temperatures the starting arrangement is given a greater assist by having the priming fuel supplied to the engine at a considerably higher temperature.

It is to be understood that the invention is not limited to the specific embodiment herein illustrated and described, but may be used in other ways without departure from its spirit as defined by the following claims.

I claim:

1. In a hot fuel priming system for an engine having an induction system, a nozzle through which fuel is admitted to the induction system, a fuel supply line to the nozzle, a heater in said line having heating means therein, a normally closed valve in said line on the outlet side of said heater, an engine starter, temperature sensitive means responsive to the fuel temperature in the heater, and means responsive to said temperature sensitive means for discontinuing a supply of energy to said heating means, for opening said valve, and for energizing said starter.

2. In a hot fuel priming system for an engine having an induction system, a nozzle through which fuel is admitted to the induction system, a fuel supply line to the nozzle, a heater in said line having heating means therein, a normally closed valve in said line on the outlet side of said heater, an engine starter, temperature sensitive means responsive to the fuel temperature in the heater, and means responsive to said temperature sensitive means for discontinuing a supply of energy to said heating means, for opening said valve, and for energizing said starter, and interlocking means to prevent simultaneous operation of said heating means and said starter.

3. In a hot fuel priming system for an engine having an induction system, a nozzle through which fuel is admitted to the induction system, a fuel supply line to the nozzle, a heater in said line having heating means therein, an engine starter, temperature sensitive means responsive to the fuel temperature in the heater and to ambient temperature, means responsive to said temperature sensitive means for discontinuing a supply of energy to the heating means when the temperature of the fuel reaches a selected value dependent upon ambient temperature, and other means responsive to said temperature sensitive means for energizing said starter.

4. In a hot fuel priming system for an engine having an induction system, a nozzle through which fuel is admitted to the induction system, a fuel supply line to the nozzle, a heater in said line having heating means therein, a valve in said line on the outlet side of said heater, an engine starter, temperature sensitive means responsive to the fuel temperature in the heater, a pair of control switches including a priming switch and a starter switch and a pair of associated circuits, one for the fuel heating system and the other for the starter, means responsive to closing of said priming switch to render inoperative the starter circuit when the temperature sensitive means is cold, and means responsive to said temperature sensitive means for closing the starter circuit and for simultaneously opening the fuel heating circuit and said valve.

5. In a hot fuel priming system for an engine having an induction system, a nozzle through which fuel is admitted to the induction system, a fuel supply line to the nozzle, a heater in said line having heating means therein, a valve in said line on the outlet side of said heater, an engine starter, temperature sensitive means responsive to the fuel temperature in the heater, a pair of control switches including a priming switch and a starter switch and a pair of associated circuits, one for the fuel heating system and the other for the starter, means responsive to closing of said priming switch to render inoperative the starter circuit, and means responsive to said temperature sensitive means for closing the starter circuit and for simultaneously opening the fuel heating circuit and said valve, said fuel heating circuit including means for rendering inoperative the starter circuit until the temperature in the heater reaches a selected value.

6. In a hot fuel priming system for an engine having an induction system, a nozzle through which fuel is admitted to the induction system, a fuel supply line to the nozzle, a heater in said line having heating means therein, an engine starter, temperature sensitive means responsive to the fuel temperature in the heater, a pair of control switches including a priming switch and a starter switch and a pair of associated circuits, one for the fuel heating system and the other for the starter, and means responsive to said temperature sensitive means for closing the starter circuit and for simultaneously opening the fuel heating circuit, said fuel heating circuit including means for rendering inoperative the starter circuit until the temperature in the heater reaches a selected value.

7. In a hot fuel priming system for an engine having an induction system, a nozzle through which fuel is admitted to the induction system, a fuel supply line to the nozzle, a heater in said line having heating means therein, an engine starter, temperature sensitive means responsive to the fuel temperature in the heater, a pair of control switches including a priming switch and a starter switch and a pair of associated circuits, one for the fuel heating system and the other for the starter, means responsive to closing of said priming switch to render inoperative the starter circuit, and means responsive to said temperature sensitive means for closing the starter circuit and for simultaneously opening the fuel heating circuit, said starting circuit including means for rendering inoperative the fuel heating circuit while the starter is in operation.

8. A priming system for an engine having a nozzle through which priming fuel is admitted to the engine to mix with the air for combustion, a supply line to said nozzle, a heater in said line having heating means associated therewith, an engine starter, temperature sensing means for the fuel in the heater, means for supplying energy to said heating means and other means for supplying energy to the starter, means responsive to said temperature sensing means and operative when the fuel temperature reaches a selected value for connecting said energy supplying means to the starter, and means independent of the temperature sensing means and responsive to the energizing of the starter for preventing the further supply of energy to the heater while the starter is operative.

9. In a hot fuel priming system for an engine having an induction system, a nozzle through which fuel is admitted to the induction system, a fuel supply line to the nozzle, a heater in said line having heating means therein, a valve in said line on the outlet side of said heater, an engine starter, temperature sensitive means responsive to the fuel temperature in the heater, and means responsive to said temperature sensitive means for discontinuing a supply of energy to said heating means and for energizing said starter and simultaneously opening said valve in said heater outlet line.

10. A priming system for an engine having a nozzle through which priming fuel is admitted to the engine to mix with the air for combustion, a supply line to said nozzle, a heater in said line having heating means associated therewith, an engine starter, temperature sensing means for the fuel in the heater, a priming circuit and a heater circuit, switch means for energizing said circuits to initiate the priming operation, and means responsive to the temperature sensing means and operative when the fuel temperature reaches a selected value for completing the circuit for the starter.

11. A priming system for an engine having a nozzle through which priming fuel is admitted to the engine to mix with the air for combustion, a supply line to said nozzle, a heater in said line having heating means associated therewith, an engine starter, temperature sensing means for the fuel in the heater, a priming circuit and a heater circuit, switch means for energizing said circuits to initiate the priming operation, and means responsive to the temperature sensing means and operative when the fuel temperature reaches a selected value for completing the circuit for the starter and simultaneously cutting off the heater.

12. A hot fuel priming system, an engine including a nozzle through which priming fuel is admitted to the engine, a supply line to the nozzle, a heater in said line having heating means associated therewith, a normally closed valve in said line downstream of said heater, temperature sensing means for the fuel in the heater, a starter, a primer circuit and a starter circuit including manually actuated priming and starting switches for said circuits, said priming circuit including switch actuating means, a first switch in said starter circuit actuated by said actuating means to open the circuit through the starter when the primer switch is closed, switch means for energizing the heater and actuated by said temperature sensing means when the fuel in the heater is cold, a second switch means for by-passing said first switch and responsive to said temperature sensing means for closing the starter circuit when the temperature of the fuel reaches a selected value, and a third switch operative when said second switch is closed and also by-passing said first switch to keep said starter circuit complete independently of subsequent changes in the temperature of the fuel in the heater.

13. A hot fuel priming system, an engine including a nozzle through which priming fuel is admitted to the engine, a supply line to the nozzle, a heater in said line having heating means associated therewith, a normally closed valve in said line downstream of said heater, temperature sensing means for the fuel in the heater, a starter, a primer circuit and a starter circuit including manually actuated priming and starting switches for said circuits, said starter circuit having three switches in parallel in said circuit, one of which is opened in response to closing of the priming switch, the second of which is normally open and is opened and closed in response to said temperature sensing means, and the third of which is closed in response to the temperature sensing means and is retained closed until the primer switch is opened, switch means in the heater circuit responsive to the temperature sensing means to open the heater circuit when the fuel in the heater reaches a selected value, said last switch means and said second switch being operated simultaneously to cut off the heater when the starter is energized, and a solenoid switch responsive to said temperature sensing means and operative simultaneously with said switch means and said second switch for opening said normally closed valve and for holding the valve open until the primer switch is opened.

14. In a hot fuel priming system for an engine having an induction system, a nozzle through which fuel is admitted to the induction system, a fuel supply line to the nozzle, a heater in said line having heating means therein, a valve in said line on the outlet side of said heater, an engine starter, temperature sensitive means responsive to the fuel temperature and the ambient air temperature, and means responsive to said temperature sensitive means for discontinuing a supply of energy to said heating means and for energizing said starter.

15. In a hot fuel priming system for an engine having an induction system, a nozzle through which fuel is admitted to the induction system, a fuel supply line to the nozzle, a heater in said line having heating means therein, a valve in said line on the outlet side of said heater, an engine starter, temperature sensitive means responsive to the fuel temperature and the ambient air temperature, a pair of control switches including a priming switch and a starter switch and a pair of associated circuits, one for the fuel heating system and the other for the starter, and means responsive to said temperature sensitive means for closing the starter circuit and for simultaneously opening the fuel heating circuit, said fuel heating circuit including means for rendering inoperative the starter circuit until the temperature in the heater reaches a selected value.

16. A priming system for an engine having a nozzle through which priming fuel is admitted to the engine to mix with the air for combustion, a supply line to said nozzle, a heater in said line having heating means associated therewith, an engine starter, means for supplying energy to the heating means, means for limiting the amount of energy supplied to the heating means, other means for supplying energy to the starter, and control means responsive to said limiting means for alternately supplying energy to the heating means and to the starter.

17. A priming system for an engine having a nozzle through which priming fuel is admitted to the engine to mix with the air for combustion, a supply line to said nozzle, a heater in said line having heating means associated therewith, an engine starter, means for supplying energy to said heating means, means for limiting the amount of energy supplied to the heating means as a function of ambient temperature, other means for supplying energy to the starter, means responsive to said limiting means and operative when the selected amount of energy has been supplied to the heating means for connecting said energy supplying means to the starter, and means responsive to the energizing of the starter for preventing the further supply of energy to the heater while the starter is operative.

18. For use with an internal combustion engine having a nozzle through which fuel is admitted to the engine, a fuel supply line to the nozzle, a starter for the engine, and a starter circuit, a hot fuel priming device including a heater adapted to be placed in said supply line, a normally closed valve adapted to be positioned in said line downstream of said heater, a temperature sensing means for fuel in said heater, a heating circuit, means controlled by said temperature sensing means for closing said starter circuit and opening the starter circuit when the fuel temperature in the heater reaches a selected value, and means adapted to be incorporated in said starter circuit to keep the heating circuit open while the starter is in operation.

19. For use with an internal combustion engine having a nozzle through which fuel is admitted to the engine, a fuel supply line to the nozzle, a starter for the engine, and a starter circuit, a hot fuel priming device including a heater adapted to be placed in said supply line, a normally closed valve adapted to be positioned in said line downstream of said heater, a temperature sensing means for fuel in said heater, a heating circuit, means controlled by said temperature sensing means for closing said starter circuit and opening the starter circuit when the fuel temperature in the heater reaches a selected value, other means also incorporated in the starter circuit to keep the starter circuit closed when it has been closed by said circuit closing means and a manually operative switch by which to open the starter circuit.

References Cited in the file of this patent

UNITED STATES PATENTS

| Number | Name | Date |
|---|---|---|
| 1,047,114 | O'Neill | Dec. 10, 1912 |
| 2,142,210 | Rippingille | Jan. 3, 1939 |